US011431356B2

(12) United States Patent
Yang

(10) Patent No.: US 11,431,356 B2
(45) Date of Patent: Aug. 30, 2022

(54) RADIO FREQUENCY SYSTEM, METHOD FOR CONTROLLING ANTENNA SWITCHING, AND RELATED PRODUCTS

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/156,501

(22) Filed: Jan. 22, 2021

(65) Prior Publication Data

US 2021/0143844 A1 May 13, 2021

Related U.S. Application Data

(63) Continuation of application No. PCT/CN2019/089887, filed on Jun. 3, 2019.

(30) Foreign Application Priority Data

Jul. 23, 2018 (CN) .......................... 201810811718.7
Jul. 25, 2018 (CN) .......................... 201810828093.5

(51) Int. Cl.
*H04B 1/00* (2006.01)
*H04B 1/04* (2006.01)
(Continued)

(52) U.S. Cl.
CPC ............ *H04B 1/006* (2013.01); *H04B 1/034* (2013.01); *H04B 1/04* (2013.01); *H04B 7/0413* (2013.01); *H04B 2001/0408* (2013.01)

(58) Field of Classification Search
CPC .......... H04B 1/006; H04B 1/034; H04B 1/04; H04B 7/0413; H04B 2001/0408
See application file for complete search history.

(56) References Cited

U.S. PATENT DOCUMENTS 9,866,259 B1    1/2018  Margomenos
2003/0002452 A1  1/2003  Sahota
(Continued)

FOREIGN PATENT DOCUMENTS

CN    101572939    11/2009
CN    101800566    8/2010
(Continued)

OTHER PUBLICATIONS

SIPO, Second Office Action for CN Application No. 201811012155.1, dated Apr. 21, 2021.
(Continued)

*Primary Examiner* — Janice N Tieu
(74) *Attorney, Agent, or Firm* — Hodgson Russ LLP

(57) ABSTRACT

A radio frequency system is provided. The radio frequency system supports a simultaneous downlink reception with four antennas and includes at least two antenna groups, a radio frequency processing circuit, and a radio frequency transceiver. The at least two antenna groups include m antennas, where m is greater than or equal to 4 and less than or equal to 8. The radio frequency processing circuit is coupled with the at least two antenna groups and includes modules which are the same in number as the at least two antenna groups. Each module is coupled with one antenna group and is disposed adjacent to the antenna group with which the module is coupled. The modules include one or more transmitting modules, or the modules include one or more transmitting modules and one or more receiving mod-
(Continued)

ules. The radio frequency transceiver is coupled with the radio frequency processing circuit.

13 Claims, 4 Drawing Sheets

(51) Int. Cl.
*H04B 7/0413* (2017.01)
*H04B 1/034* (2006.01)

(56) References Cited

U.S. PATENT DOCUMENTS

| | | | |
|---|---|---|---|
| 2005/0048938 A1 | 3/2005 | Sahota | |
| 2012/0009887 A1 | 1/2012 | Sanguinetti et al. | |
| 2014/0334564 A1 | 11/2014 | Singh et al. | |
| 2014/0378188 A1 | 12/2014 | Liu et al. | |
| 2015/0257022 A1 | 9/2015 | Kohlmann et al. | |
| 2017/0026071 A1* | 1/2017 | Young | H01L 23/66 |
| 2017/0078053 A1 | 3/2017 | Sanderovich et al. | |
| 2017/0149457 A1 | 5/2017 | Mayer et al. | |
| 2017/0331528 A1 | 11/2017 | Gamand et al. | |
| 2018/0145718 A1* | 5/2018 | Margomenos | H05K 999/99 |
| 2019/0200357 A1* | 6/2019 | Yokote | H04B 1/525 |
| 2020/0328764 A1 | 10/2020 | Ge et al. | |
| 2020/0374378 A1* | 11/2020 | Maatta | H01Q 9/42 |
| 2021/0194515 A1* | 6/2021 | Go | H04B 1/04 |

FOREIGN PATENT DOCUMENTS

| | | |
|---|---|---|
| CN | 101854198 | 10/2010 |
| CN | 202103661 | 1/2012 |
| CN | 103780299 | 5/2014 |
| CN | 104753553 | 7/2015 |
| CN | 105553505 | 5/2016 |
| CN | 105577206 | 5/2016 |
| CN | 105827269 | 8/2016 |
| CN | 106559277 | 4/2017 |
| CN | 106792938 | 5/2017 |
| CN | 206195770 | 5/2017 |
| CN | 106876874 | 6/2017 |
| CN | 106878502 | 6/2017 |
| CN | 206451812 | 8/2017 |
| CN | 206472169 | 9/2017 |
| CN | 206498399 | 9/2017 |
| CN | 108111185 | 6/2018 |
| CN | 108199726 | 6/2018 |
| CN | 108199727 | 6/2018 |
| CN | 108199728 | 6/2018 |
| CN | 108199729 | 6/2018 |
| CN | 108282182 | 7/2018 |
| CN | 108462497 | 8/2018 |
| CN | 108964677 | 12/2018 |
| CN | 108988875 | 12/2018 |
| CN | 108988904 | 12/2018 |
| CN | 109274788 | 1/2019 |
| EP | 2939349 | 11/2015 |
| EP | 3540959 | 9/2019 |
| EP | 3540970 | 9/2019 |
| WO | 03001701 | 1/2003 |

OTHER PUBLICATIONS

CNIPA, Third Office Action for CN Application No. 201811012155.1, dated Sep. 3, 2021.
EPO, Extended European Search Report for EP Application No. 19841769.3, dated Jul. 15, 2021.
WIPO, ISR for PCT/CN2019/089887, Aug. 2, 2019.
SIPO, First Office Action for CN Application No. 201810828093.5, dated Oct. 29, 2019.
SIPO, Second Office Action for CN Application No. 201810828093.5, dated Apr. 17, 2020.
Qorvo, "QM78200: 5G PAMiD Module," Preliminary Product Data Sheet, 2019, 41 pages.
Qorvo, "QM78201: 5G PAMiD Module," Preliminary Product Data Sheet, 2019, 25 pages.
China Mobile, "5g scale test technology demand terminal," White Paper, 2018, 24 pages.
SIPO, First Office Action for CN Application No. 201810829132.3, dated Oct. 25, 2019.
SIPO, Second Office Action for CN Application No. 201810829132.3, dated Apr. 17, 2020.
SIPO, First Office Action for CN Application No. 201810826754.0, dated Jul. 19, 2019.
SIPO, Notification to Grant Patent Right for Invention for CN Application No. 201810826754.0, dated Jul. 14, 2020.
SIPO, First Office Action for CN Application No. 201810826752.1, dated Oct. 25, 2019.
SIPO, Second Office Action for CN Application No. 201810826752.1 dated Apr. 17, 2020.
SIPO, First Office Action for CN Application No. 201811231562.1, dated Oct. 29, 2019.
SIPO, Notification to Grant Patent Right for Invention for CN Application No. 201811231562.1, dated Apr. 17, 2020.
SIPO, First Office Action for CN Application No. 201811077485.9, dated Oct. 28, 2019.
SIPO, Second Office Action for CN Application No. 201811077485.9, dated Apr. 17, 2020.
SIPO, First Office Action for CN Application No. 201811013432.0, dated Oct. 30, 2019.
SIPO, Second Office Action for CN Application No. 201811013432.0, dated Apr. 20, 2020.
SIPO, First Office Action for CN Application No. 201811141973.1, dated Sep. 30, 2020.
SIPO, First Office Action for CN Application No. 201811058582.3, dated Oct. 28, 2019.
SIPO, Second Office Action for CN Application No. 201811058582.3, dated Apr. 20, 2020.
SIPO, First Office Action for CN Application No. 201811005156.3, dated Oct. 29, 2019.
SIPO, Second Office Action for CN Application No. 201811005156.3, dated Apr. 20, 2020.
SIPO, First Office Action for CN Application No. 201811005134.7, dated Oct. 29, 2019.
SIPO, Second Office Action for CN Application No. 201811005134.7, dated Apr. 22, 2020.
SIPO, First Office Action for CN Application No. 201811013431.6, dated Nov. 1, 2019.
SIPO, Second Office Action for CN Application No. 201811013431.6, dated Apr. 22, 2020.
SIPO, First Office Action for CN Application No. 201811143295.2, dated Dec. 8, 2020.
SIPO, First Office Action for CN Application No. 201811141964.2, dated Oct. 30, 2019.
SIPO, Second Office Action for CN Application No. 201811141964.2, dated Apr. 22, 2020.
SIPO, First Office Action for CN Application No. 201811006072.1, dated Oct. 30, 2019.
SIPO, Second Office Action for CN Application No. 201811006072.1, dated Apr. 22, 2020.
SIPO, First Office Action for CN Application No. 201811012155.1, dated Oct. 28, 2020.
SIPO, First Office Action for CN Application No. 201811013839.3, dated Feb. 6, 2020.
SIPO, Notification to Grant Patent Right for Invention for CN Application No. 201811013839.3, dated Nov. 4, 2020.
SIPO, First Office Action for CN Application No. 201811143217.2, dated Nov. 1, 2019.
SIPO, Second Office Action for CN Application No. 201811143217.2, dated Apr. 22, 2020.
SIPO, First Office Action for CN Application No. 201811058579.1, dated Feb. 3, 2020.
WIPO, ISR for PCT/CN2019/089888, Jul. 25, 2019.
WIPO, ISR for PCT/CN2019/089889, Aug. 8, 2019.
WIPO, ISR for PCT/CN2019/089890, Jul. 29, 2019.
WIPO, ISR for PCT/CN2019/093970, Aug. 28, 2019.

(56) References Cited

OTHER PUBLICATIONS

Qualcomm Technologies, Inc., "QPM5650 5G Sub-6 GHz n77/n78 LPAF Module," Device Specification, 2020, 26 pages.
Qualcomm Technologies, Inc., "QPM5651 5G Sub-6 GHz n77/n78/n79 LPAF Module," Device Specification, 2020, 28 pages.
CNIPA, Refusal Decision for CN Application No. 201811012155.1, dated Jan. 30, 2022.

* cited by examiner

SWITCHING ON A TRANSMITTING PATH BETWEEN A TRANSMITTING PORT IN A TARGET BAND OF THE RADIO FREQUENCY TRANSCEIVER AND A TARGET ANTENNA GROUP IN THE RADIO FREQUENCY SYSTEM, TO TRANSMIT A SIGNAL THROUGH AN ANTENNA IN THE TARGET ANTENNA GROUP ⟵ 401
FIG. 4
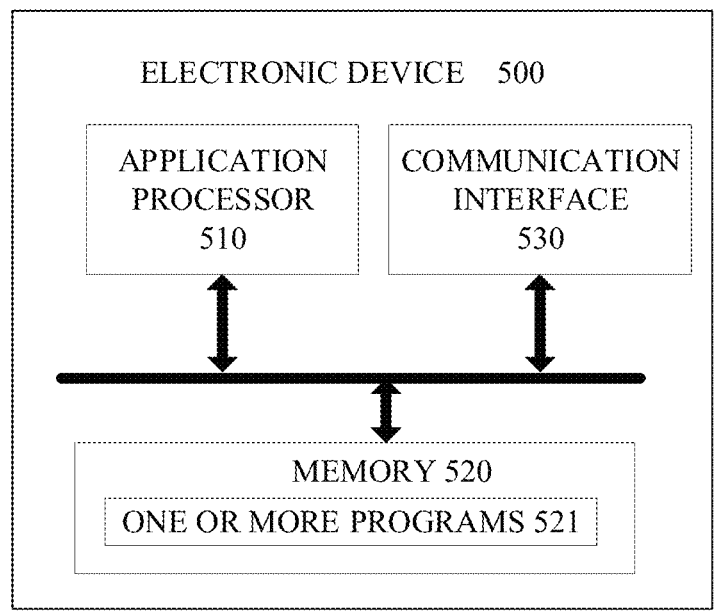
FIG. 5
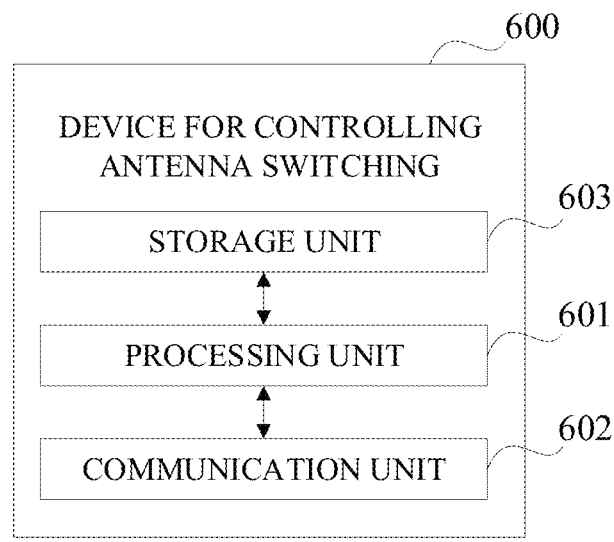
FIG. 6

RADIO FREQUENCY SYSTEM, METHOD FOR CONTROLLING ANTENNA SWITCHING, AND RELATED PRODUCTS

CROSS-REFERENCE TO RELATED APPLICATION(S)

This application is a continuation of International Application No. PCT/CN2019/089887, filed on Jun. 3, 2019, which claims priority to Chinese Patent Application No. 201810828093.5, filed on Jul. 25, 2018 and Chinese Patent Application No. 201810811718.7, filed on Jul. 23, 2018, the entire disclosures of which are hereby incorporated by reference.

TECHNICAL FIELD

This disclosure relates to the field of mobile terminal technology, and particularly to a radio frequency system, a method for controlling antenna switching, and related products.

BACKGROUND

With the widespread use of electronic devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the electronic device generally adopts a single-antenna or dual-antenna radio frequency (RF) system architecture. Currently, in a new radio (NR) system of the fifth generation (5G) mobile communication system, requirements on a RF system architecture supporting four antenna groups are proposed.

SUMMARY

In a first aspect, implementations provide a radio frequency system. The radio frequency system supports a simultaneous downlink reception with four antennas and includes at least two antenna groups, a radio frequency processing circuit, and a radio frequency transceiver. The at least two antenna groups include m antennas, where m is greater than or equal to 4 and less than or equal to 8. The radio frequency processing circuit is coupled with the at least two antenna groups and includes modules which are the same in number as the at least two antenna groups. Each module is coupled with one antenna group and is disposed adjacent to the antenna group with which the module is coupled. The modules include one or more transmitting modules, or the modules include one or more transmitting modules and one or more receiving modules. The radio frequency transceiver is coupled with the radio frequency processing circuit.

In a second aspect, implementations provide an electronic device. The electronic device includes a radio frequency system and a battery surrounded by the radio frequency system. The radio frequency system supports a simultaneous downlink reception with four antennas and includes at least two antenna groups, a radio frequency processing circuit, and a radio frequency transceiver. The at least two antenna groups includes m antennas, where m is greater than or equal to 4 and less than or equal to 8. The radio frequency processing circuit is coupled with the at least two antenna groups and includes modules which are the same in number as the at least two antenna groups. The modules include one or more transmitting modules or one or more transmitting modules and one or more receiving modules. Each transmitting module is disposed adjacent to an antenna group with which the transmitting module is coupled, and each receiving module is disposed adjacent to an antenna group with which the receiving module is coupled. The radio frequency transceiver is coupled with the radio frequency processing circuit.

The electronic device at least includes any of: a mobile terminal and a base station.

In a third aspect, implementations provide a method for controlling antenna switching. The method is applicable to an electronic device. The electronic device includes a radio frequency system. The radio frequency system includes a radio frequency transceiver, a radio frequency processing circuit coupled with the radio frequency transceiver, and at least two antenna groups coupled with the radio frequency processing circuit. The method includes the following. A transmitting path between a transmitting port in a target band of the radio frequency transceiver and a target antenna group in the radio frequency system is switched on, to transmit a signal through an antenna in the target antenna group.

BRIEF DESCRIPTION OF THE DRAWINGS

To describe technical solutions in implementations or in the related art more clearly, the following briefly introduces the accompanying drawings required for describing the implementations or the related art. Apparently, the accompanying drawings in the following description only illustrate some implementations. Those of ordinary skill in the art may also obtain other drawings based on these accompanying drawings without creative efforts.

FIG. 4 is a schematic flowchart illustrating a method for antenna switching according to implementations.

FIG. 5 is a schematic structural diagram illustrating an electronic device according to implementations.

FIG. 6 is a block diagram illustrating functional units of a device for antenna switching according to implementations.

DETAILED DESCRIPTION

Figure 1A:
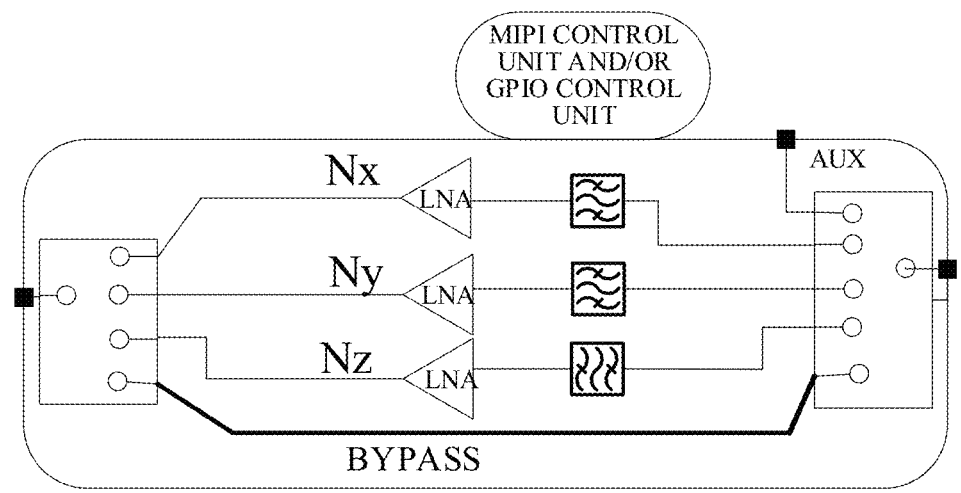
FIG. 1A is a schematic structural diagram illustrating a receiving module according to implementations.

Technical solutions in implementations will be described clearly and completely hereinafter with reference to the accompanying drawings described in the previous chapter. Apparently, the described implementations are merely some rather than all implementations. All other implementations obtained by those of ordinary skill in the art based on the implementations without creative efforts shall fall within the protection scope.

The terms "first", "second", and the like used in the specification, the claims, and the accompany drawings are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "implementation" referred to herein means that a particular feature, structure, or characteristic described in conjunction with the implementation may be contained in at least one implementation. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The electronic device involved in the implementations may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the above-mentioned devices are collectively referred to as an electronic device.

At present, sounding reference signal (SRS) switching in four antennas of a mobile phone is a mandatory option for China mobile communications corporation (CMCC) in the China mobile fifth generation (5G) Scale Test Technical White Paper_Terminal, which is optional in the 3rd generation partnership project (3GPP). Its main purpose is for a base station to determine quality and parameters of four channels via measuring uplink (UL) signals of the four antennas of the mobile phone, to perform beamforming of a downlink optimal multi-input multi-output (MIMO) antenna array on the four channels according to a channel reciprocity, and finally to obtain the best data transmission performance for a downlink 4×4 MIMO.

The electronic device may be a mobile phone or other terminal devices supporting the fifth generation new radio (5G NR), such as a customer premise equipment (CPE) or a mobile wireless-fidelity (MIFI).

The reasons for structuring modules (including a receiving module and a transmitting module) in a radio frequency system presented in the implementations are as follows. ① 5GNR requires downlink 4×4 MIMO or four-way diversity reception; ② SRS switching in four antennas or transmitting (TX) an SRS with four antennas in turn (optional); ③ a function of switching among transmit antennas (optional); ④ the sub 6 GHz band ranges from 3.3 to 4.2G and 4.4 to 5G. This band has a higher frequency than the 600-2700 MHz band of LTE (long term evolution). Therefore, the loss of the radio frequency (RF) cable (coaxial cable), from one side of a main board to the other side of the main board and from the main board to a secondary board (also called a lower board), is large.

The formula of sensitivity of a system: $Ps=10\lg(KT)+10\lg(BW)+NF+SNR$;

K: Boltzmann constant (1.38×E-23, unit: J/K);
T: Absolute temperature (273.15, unit: K); the formula adopts 20° C. (normal temperature), so T=293.15;
NF: Noise figure;
BW: Bandwidth;
SNR: Minimum demodulation threshold, determined by the platform vendor (Qualcomm, MTK) baseband algorithm;

In this formula, K and T are fixed constants, BW is determined by a tested bandwidth, and SNR is determined by the baseband algorithm of the system.

The formula regarding NF is as follows.

$$NF = NF_1 + \frac{NF_2 - 1}{G_1} + \ldots + \frac{NF_1 - 1}{G_1 G_2 \ldots G_{i-1}} + \ldots + \frac{NF_n - 1}{G_1 G_2 \ldots G_{n-1}}$$

In the above formula, $NF_1 = IL_{pre-1st\ LNA} + NF_{1st\ LNA}$, where $IL_{pre-1st\ LNA}$ is an insertion loss occurred before an LNA (low noise amplifier) in a first stage, and $NF_{1st\ LNA}$ is a noise figure in the first stage. These two are main contributions of NF.

In contrast, $$\frac{NF_2 - 1}{G_1} + \ldots + \frac{NF_1 - 1}{G_1 G_2 \ldots G_{i-1}} + \ldots + \frac{NF_n - 1}{G_1 G_2 \ldots G_{n-1}}$$

is the contribution of the noise figure in a latter stage. Generally, Gn>15 and NF2~NFn<5, this part contributes less to NF.

In conclusion, in the RF front-end design, in order to improve the sensitivity, it is necessary to reduce the value of NF. As $NF_1$ is the main contributor, in addition to using external LNAs to reduce $NF_{1st\ LNA}$, how to reduce $IL_{pre-1st\ LNA}$ becomes a problem to be solved, that is, how to reduce the insertion loss occurred before the LNA in the first stage.

The radio frequency system for 5GNR is defined in the implementations. The receiving module and the transmitting module in the radio frequency system can be disposed adjacent to antennas, to reduce the insertion loss occurred before the LNA in the first stage and improve the sensitivity of the system.

In a first aspect, implementations provide a receiving module. The receiving module is applicable to a radio frequency system. The radio frequency system is operable in triple band. The receiving module includes three signal receiving channels, a first transfer switch, and a second transfer switch. The first transfer switch is coupled with the three signal receiving channels. The three signal receiving channels are coupled with the second transfer switch.

The first transfer switch includes (or is embodied as) a single-pole five-throw (SP5T) switch. The second transfer switch includes (or is embodied as) a single-pole quad-throw (SP4T) switch. Each of the three receiving channels includes a filter and a low noise amplifier (LNA), and the LNA is coupled with the filter.

The first transfer switch is configured to be coupled with an antenna in an antenna group (also known as antenna array) corresponding to the receiving module. The second transfer switch is configured to be coupled with a transmitting module. The receiving module is disposed adjacent to the antenna group.

In this implementation, since the receiving module is integrated with the three signal receiving channels and is disposed adjacent to a corresponding antenna group, it is possible to reduce insertion loss of the link and beneficial to improving sensitivity of the channel. Compared with a structure in which devices are separated, the degree of integration is higher and the area/cost/power consumption is optimized.

In at least one implementation, the receiving module further includes one internal Bypass channel, and the internal Bypass channel is disposed between the first transfer switch and the second transfer switch and is configured to be coupled with the transmitting module to support a signal transmitting function of the receiving module.

The receiving module further includes one auxiliary port (AUX). The AUX is coupled with the first transfer switch and is configured to be coupled with the transmitting module to support the signal transmitting function of the receiving module. Compared with adopting an external Bypass channel, this structure can save one switch, thereby further reducing the insertion loss of the channel.

The receiving module further includes two AUXs, i.e., a first AUX and a second AUX. The first AUX is coupled with the first transfer switch. The second AUX is coupled with the second transfer switch. An external Bypass channel is disposed between the first AUX and the second AUX and is configured to be coupled with the transmitting module to support the signal transmitting function of the receiving module.

The receiving module further includes three AUXs, i.e., a first AUX, a second AUX, and a third AUX. The first AUX and the second AUX are coupled with the first transfer switch. The third AUX is coupled with the second transfer switch. The first AUX or the second AUX is configured to be coupled with the transmitting module to support the signal transmitting function of the receiving module.

Alternatively, the first AUX and the third AUX or the second AUX and the third AUX are configured to be coupled with an external Bypass channel and the external Bypass channel is configured to be coupled with the transmitting module to support the signal transmitting function of the receiving module.

The receiving module supports the signal transmitting function.

The receiving module is disposed on a main board of an electronic device, and one AUX of the receiving module, which is coupled with the first transfer switch, is configured to be coupled with the transmitting module.

Alternatively, the receiving module is disposed on a secondary board of the electronic device, and the first AUX or the second AUX is coupled with the third AUX.

With the receiving module, NF of a receiving path can be reduced and sensitivity during receiving can be improved.

Furthermore, the receiving module further includes the following features.

(1) Each receiving module is coupled with a corresponding antenna group (including one or two antennas) and is disposed adjacent to an antenna (feed point of the antenna) with which the receiving module is coupled.

(2) For the NR carrier aggregation (CA) scenario, when multiple signal receiving channels are required to work simultaneously, the simultaneous working of the multiple signal receiving channels can also be achieved by introducing a combiner(s). In this way, extra cables are not required but other devices are introduced, and thus the trace can be more simplified. In addition, the simultaneous working of the multiple signal receiving channels can be achieved with two filters sharing one port and a special design (that is, constituting a duplexer or multiplexer), which can achieve combining. In this way, there is no need to introduce new cables or devices, and thus the cost and area can be even better restricted.

(3) This module has a shielding layer or no shielding layer (a shielding cover is required if there is no shielding layer).

In addition, the receiving module further includes a mobile industry processor interface (MIPI) control unit and/or a general-purpose input/output (GPIO) control unit. The MIPI control unit and/or the GPIO control unit is configured to control devices in the receiving module. The devices include any one of: a first transfer switch and a second transfer switch.

The following elaborates the configuration of the receiving module of the implementations.

As illustrated in FIG. 1A, the receiving module includes three LNAs (including a first LNA, a second LNA, and a third LNA), three filters (including a first filter, a second filter, and a third filter), one AUX, two transfer switches (including a first transfer switch and a second transfer switch), and one internal Bypass channel. The first transfer switch is configured to be coupled with an antenna and includes an SP5T switch, and the second transfer switch is configured to be coupled with a radio frequency transceiver and/or a transmitting module and includes an SP4T switch. Nx, Ny, and Nz correspond to triple band. The receiving module may also include an MIPI control unit and/or a GPIO control unit to achieve switching control of LNA/switch.

The first transfer switch has a P port configured to be coupled with the antenna. The first transfer switch has a first T port coupled with the AUX. The first transfer switch has a second T port, a third T port, and a fourth T port that are respectively coupled with the first filter, the second filter, and the third filter. The first filter is coupled with the first LNA. The second filter is coupled with the second LNA. The third filter is coupled with the third LNA. The first LNA, the second LNA, and the third LNA are respectively coupled with a first T port, a second T port, and a third T port of the second transfer switch. The internal Bypass channel is disposed between a fifth T port of the first transfer switch and a fourth T port of the second transfer switch. The second transfer switch has a P port configured to be coupled with the transmitting module and/or the radio frequency transceiver.

Figure 1B:
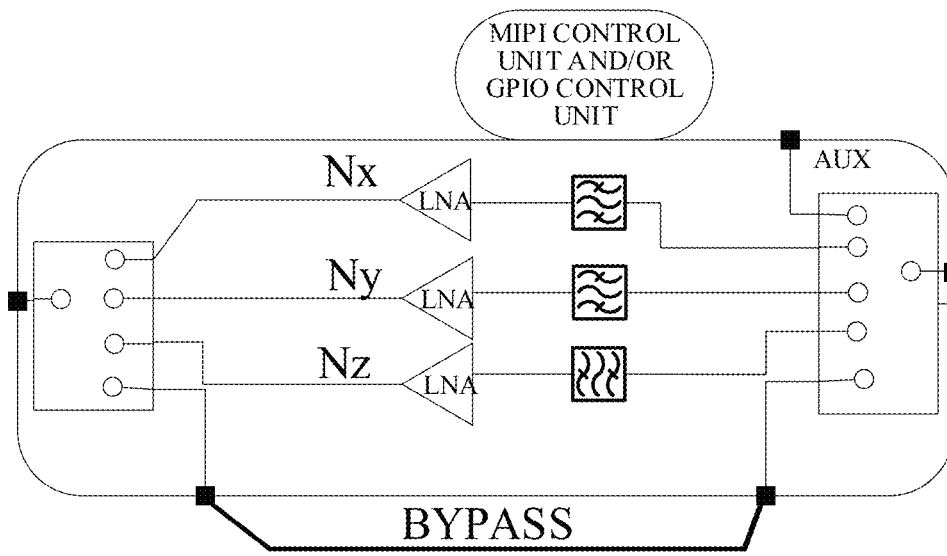
FIG. 1B is a schematic structural diagram illustrating a receiving module according to other implementations.

As illustrated in FIG. 1B, the receiving module includes three LNAs (including a first LNA, a second LNA, and a third LNA), three filters (including a first filter, a second filter, and a third filter), three AUXs (including a first AUX, a second AUX, and a third AUX), and two transfer switches (including a first transfer switch and a second transfer switch). The first AUX and the second AUX are coupled with the first transfer switch, and the third AUX is coupled with the second transfer switch. An external Bypass channel is configured to be disposed between the first AUX and the third AUX or between the second AUX and the third AUX to support a signal transmitting function of the receiving module. The first AUX or second AUX is configured to be coupled with a transmitting module to support the signal transmitting function of the receiving module. The first transfer switch is configured to be coupled with an antenna and includes an SP5T switch. The second transfer switch is configured to be coupled with a radio frequency transceiver and/or the transmitting module and includes an SP4T switch. Nx, Ny, and Nz correspond to triple band. The receiving module may also include an MIPI control unit and/or a GPIO control unit to achieve switching control of LNA/switch.

The first transfer switch has a P port configured to be coupled with the antenna. The first transfer switch has a first T port coupled with the first AUX. The first transfer switch has a second T port, a third T port, and a fourth T port that are coupled with the first filter, the second filter, and the third filter. The first filter is coupled with the first LNA. The second filter is coupled with the second LNA. The third filter is coupled with the third LNA. The first LNA, the second LNA, and the third LNA are coupled with a first T port, a second T port, and a third T port of the second transfer switch. The external Bypass channel is configured to be coupled between a fifth T port of the first transfer switch and a fourth T port of the second transfer switch. The second transfer switch has a P port configured to be coupled with the transmitting module.

According to the implementations, as the receiving module can support switching of the signal transmitting function of the antenna through the internal Bypass channel or the external Bypass channel and the receiving module is disposed adjacent to the antenna group with which the receiving module is coupled, it is beneficial to improving sensitivity of various channels. Moreover, compared with a structure in which devices are separated, the integrated module has higher degree of integration and lower area/cost/power consumption.

In a second aspect, implementations provide a transmitting module. The transmitting module is applicable to a radio frequency system. The radio frequency system is operable in triple band. The transmitting module includes three signal transmit-receive processing circuits, one power coupler, and two channel selector-switches (including a first channel selector-switch and a second channel selector-switch). The three signal transmit-receive processing circuits are coupled with the first channel selector-switch. The first channel selector-switch is coupled with the power coupler. The power coupler is coupled with the second channel selector-switch. The first channel selector-switch includes (or is embodied as) a single-pole triple-throw (SP3T) switch and the second channel selector-switch includes (or is embodied as) a quad-pole quad-throw (4P4T) switch and is a channel selector-switch in simplified connection.

The second channel selector-switch is coupled with an antenna group corresponding to the transmitting module. The transmitting module is disposed adjacent to the antenna group.

The channel selector-switch in simplified connection refers to a channel selector-switch including one or more non-full-coupling ports. The non-full-coupling port refers to a port that is not coupled with all peer ports. For example, in a 4P4T switch, a first T port can be coupled with all the four P ports but each of a second T port, a third T port, and a fourth T port can only be coupled with one P port.

According to the implementation, as the transmitting module is integrated with the signal transmit-receive processing circuit and includes the channel selector-switch in simplified connection, it is possible to reduce the number of switches in the radio frequency (RF) link and insertion loss of the link and is beneficial to improving sensitivity of various channels. Compared with a structure in which devices are separated, degree of integration is higher and area/cost/power consumption is optimized.

In at least one implementation, the second channel selector-switch is coupled with the antenna group corresponding to the transmitting module.

In at least one example, each signal transmit-receive processing circuit includes one power amplifier (PA), one LNA, one transmit-receive transfer switch, and one filter. The PA and the LNA are coupled with the transmit-receive transfer switch. The transmit-receive transfer switch is coupled with the filter. The three signal transmit-receive processing circuits are coupled with the first channel selector-switch. The first channel selector-switch is coupled with the power coupler. The power coupler is coupled with the second channel selector-switch. The transmit-receive transfer switch includes a single-pole double-throw (SPDT) switch.

In at least one example, the PA of the signal transmit-receive processing circuit has an input port configured to be coupled with a signal transmitting port of a radio frequency transceiver. The LNA of the signal transmit-receive processing circuit has an output port configured to be coupled with a signal receiving port of the radio frequency transceiver. The power coupler is configured to be coupled with a power detection (PDET) port of the radio frequency transceiver.

In at least one example, the first channel selector-switch and/or the second channel selector-switch has at least three ports served as external ports of the transmitting module, where one or two external ports of the external ports are configured to be coupled with an antenna(s) of the antenna group, and the rest of the external ports are configured to be coupled with a signal receiving port(s) of a receiving module, the radio frequency transceiver, and/or other transmitting modules.

In at least one example, the transmitting module further includes an MIPI unit and/or a GPIO control unit. The MIPI control unit and/or the GPIO control unit is configured to control devices in the transmitting module. The device includes any one of: a transmit-receive transfer switch, a channel selector-switch, and a power detection selector-switch.

The following is described with examples.

Figure 2:
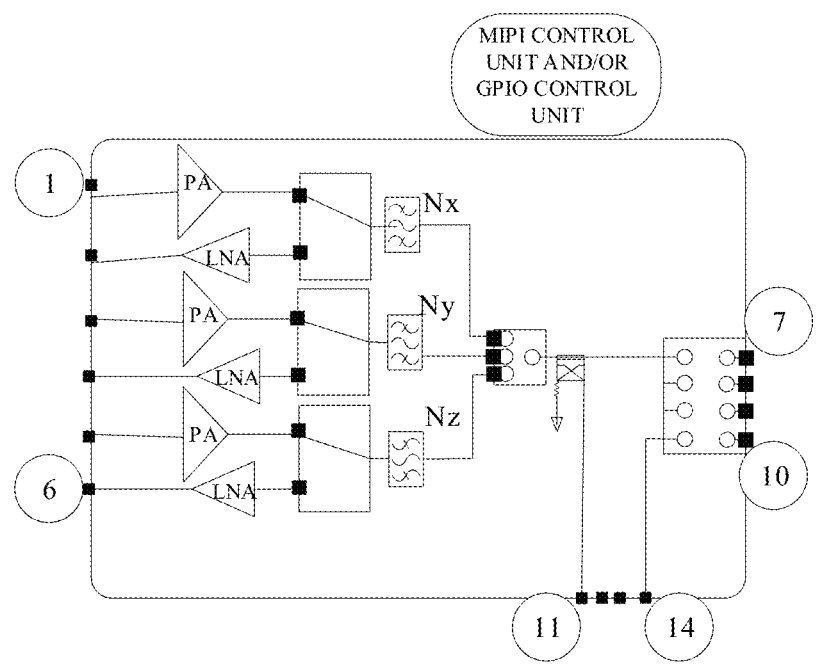
FIG. 2 is a schematic structural diagram illustrating a transmitting module according to implementations.

As illustrated in FIG. 2, the transmitting module includes three signal transmit-receive processing circuits, one power coupler, and two channel selector-switches (including a first channel selector-switch and a second channel selector-switch). Each signal transmit-receive processing circuit includes one PA, one LNA, one transmit-receive transfer switch (including an SPDT switch), and one filter. A first PA and a first LNA are coupled with a first transmit-receive transfer switch. The first transmit-receive transfer switch is coupled with a first filter. A second PA and a second LNA are coupled with a second transmit-receive transfer switch. The second transmit-receive transfer switch is coupled with a second filter. A third PA and a third LNA are coupled with a third transmit-receive transfer switch. The third transmit-receive transfer switch is coupled with a third filter. The first filter, the second filter, and the third filter are coupled with the first channel selector-switch, and the first channel selector-switch is coupled with the power coupler. The power coupler is coupled with the second channel selector-switch. The transmitting module can also include an MIPI control unit and/or a GPIO control unit to achieve switching control of LNA/switch.

An input port of the first PA corresponds to a first external port of the transmitting module. An output port of the first LNA corresponds to a second external port of the transmitting module. An input port of the second PA corresponds to a third external port of the transmitting module. An output port of the second LNA corresponds to a fourth external port of the transmitting module. An input port of the third PA corresponds to a fifth external port of the transmitting module. An output port of the third LNA corresponds to a sixth external port of the transmitting module. A first P port, a second P port, a third P port, and a fourth P port of the second channel selector-switch correspond to a seventh external port, an eighth external port, a ninth external port, and a tenth external port of the transmitting module. A port of the power coupler corresponds to an eleventh external port of the transmitting module. A second T port, a third T port, and a fourth T port of the second channel selector-switch correspond to a twelfth external port, a thirteenth external port, and a fourteenth external port of the transmitting module.

The first external port, the third external port, and the fifth external port are configured to be coupled with signal transmitting ports of a radio frequency transceiver. The seventh external port is configured to be coupled with an antenna of a corresponding antenna group. The eighth external port, the ninth external port, and the tenth external port are configured to be coupled with a receiving module or coupled with a receiving module and a transmitting module. The eleventh external port is configured to be coupled with a PDET port of the radio frequency transceiver. The external port(s) among the second external port, the fourth external port, the sixth external port, the twelfth external port, the thirteenth external port, and the fourteenth external port is configured to be coupled with a signal receiving port(s) of the radio frequency transceiver or a receiving port selector-switch. Alternatively, the external port(s) among the twelfth external port, the thirteenth external port, and the fourteenth external port is configured to be coupled with external ports of other transmitting modules.

Figure 3A:
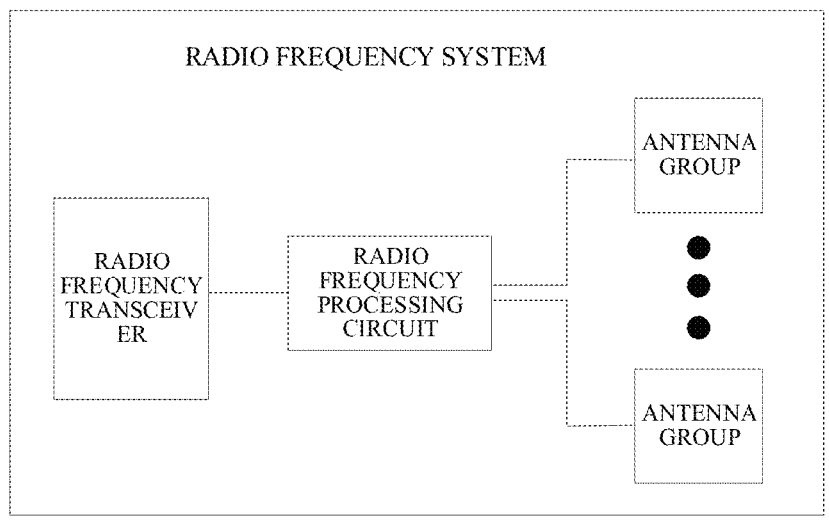
FIG. 3A is a schematic structural diagram illustrating a radio frequency system according to implementations.

In a third aspect, with the definitions of the above receiving module and transmitting module, a 5G radio frequency architecture supporting an electronic device is provided. The above receiving module and the transmitting module are applied to an electronic device. As illustrated in FIG. 3A, a radio frequency system includes a radio frequency transceiver, a radio frequency processing circuit, and at least two antenna groups. The radio frequency transceiver is coupled with the radio frequency processing circuit, and the radio frequency processing circuit is coupled with the at least two antenna groups.

The radio frequency system supports a simultaneous downlink reception with four antennas. The at least two antenna groups include m antennas, and m is greater than or equal to 4 and less than or equal to 8. The radio frequency processing circuit includes multiple modules which are the same in number as the at least two antenna groups. Each module is coupled with one antenna group, and is disposed adjacent to the antenna group with which the module is coupled. The modules include one or more transmitting modules, or one or more transmitting modules and one or more receiving modules.

In an example, m=4, the at least two antenna groups include four antenna groups (including a first antenna group, a second antenna group, a third antenna group, and a fourth antenna group), and the radio frequency processing circuit includes two transmitting modules (including a first transmitting module and a second transmitting module) and two receiving modules (including a first receiving module and a second receiving module). In such case, the first transmitting module is disposed adjacent to the first antenna group, the second transmitting module is disposed adjacent to the second antenna group, the first receiving module is disposed adjacent to the third antenna group, and the second receiving module is disposed adjacent to the fourth antenna group.

In this example, as various modules of the radio frequency system are disposed adjacent to corresponding antenna groups and only the receiving module and the transmitting module are used to construct a central processing circuit, it is beneficial to improving sensitivity of various channels. Compared with a structure in which devices are separated, the degree of integration is higher and the area/cost/power consumption is optimized.

In at least one implementation, in the case that the radio frequency system supports a dual-transmit mode, the radio frequency processing circuit includes two transmitting modules.

In at least one implementation, the radio frequency system further comprises a main board, where the main board is configured to dispose the two transmitting modules.

In at least one implementation, m=4, the at least two antenna groups include four antenna groups, and each antenna group includes one antenna. The radio frequency processing circuit further includes two receiving modules. The radio frequency system further comprises a secondary board, wherein the secondary board is configured to dispose the two receiving modules.

In at least one implementation, the radio frequency transceiver is coupled with each transmitting module. Each transmitting module is coupled with one receiving module disposed on the secondary board to support signal receiving and transmitting functions of the receiving module, where the Bypass channel of the receiving module needs to be switched on to support the signal transmitting function.

In at least one implementation, the radio frequency processing circuit further includes two receiving port selector-switches, each receiving port selector-switch is coupled with signal receiving ports of the radio frequency transceiver and a corresponding transmitting module, and the receiving port selector-switch includes an SP3T switch.

The following elaborates the radio frequency system of the implementation.

Figure 3B:
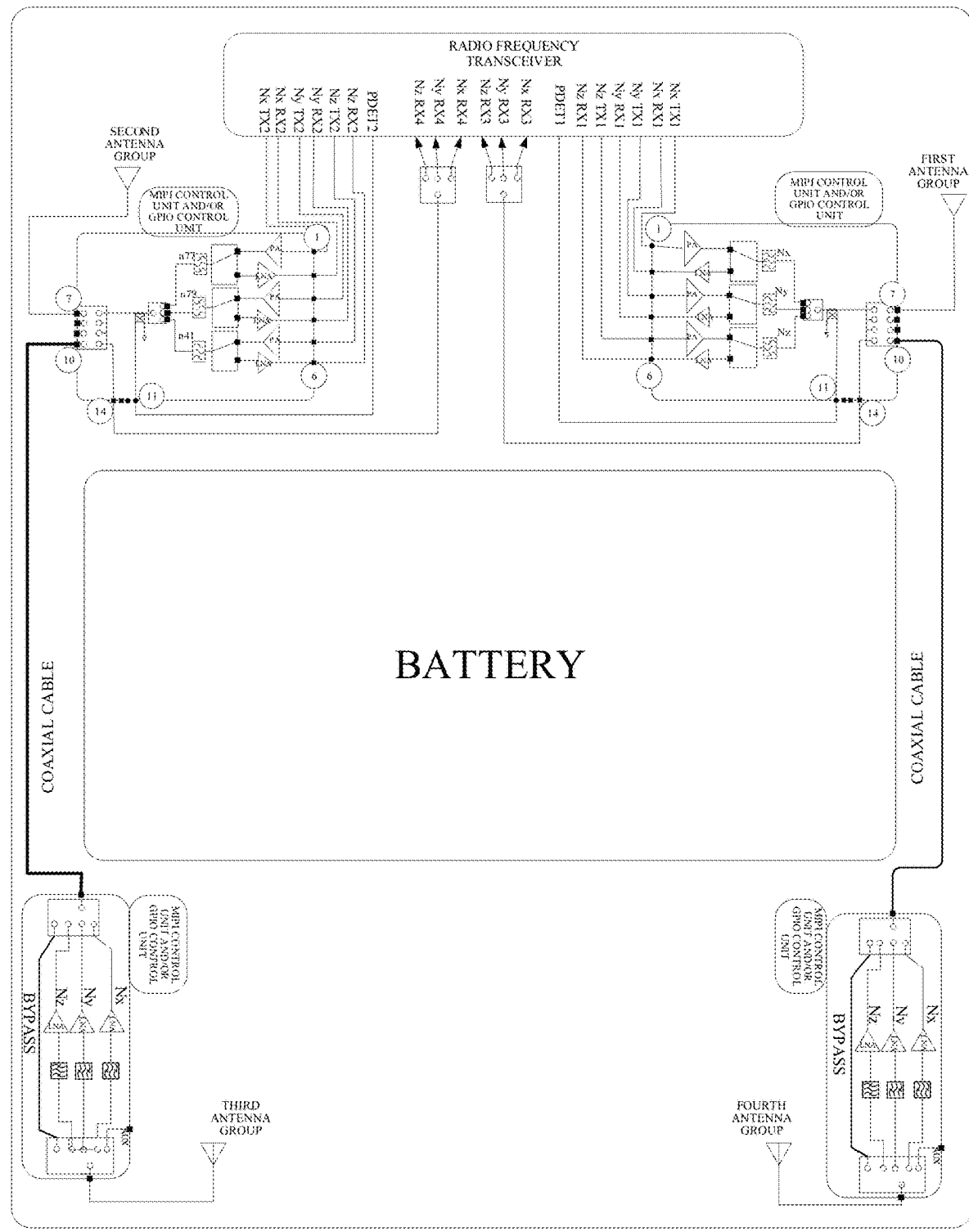
FIG. 3B is a schematic structural diagram illustrating a radio frequency system according to other implementations.

As illustrated in FIG. 3B, in this example, the radio frequency architecture has the following function: ① supporting 5G NR triple band; ② not supporting UL CA; ③ not supporting DL CA; ④ supporting SRS switching in four antennas; ⑤ supporting NR 2T4R (two transmitting paths and four receiving paths in one band).

The 5G radio frequency architecture includes a radio frequency transceiver, two transmitting modules, two receiving modules, two receiving port selector-switches (including a first receiving port selector-switch and a second receiving port selector-switch), and four antenna groups (including a first antenna group, a second antenna group, a third antenna group, and a fourth antenna group), where each antenna group includes one antenna. The radio frequency transceiver, the first transmitting module and the second transmitting module, and the first receiving port selector-switch and the second receiving port selector-switch are disposed on a main board (which is located above a battery in the figure). The first receiving module and the second receiving module are disposed on a secondary board (which is located below the battery in the figure).

The first transmitting module is located adjacent to the first antenna group, the second transmitting module is located adjacent to the second antenna group, the first receiving module is located adjacent to the third antenna group, and the second receiving module is located adjacent to the fourth antenna group. In an example, the module is disposed adjacent to a feed point of an antenna with a relative distance ranging from 1-100 mm.

The structure and connection of internal devices of the transmitting module are similar to that of FIG. 2 and the structure and connection of internal devices of the receiving module are similar to that of FIG. 1A. A first T port of a second channel selector-switch of the first transmitting module is fully coupled with four P ports (that is, coupled with all the four P ports) of the second channel selector-switch of the first transmitting module. A first T port of a second channel selector-switch of the second transmitting module is fully coupled with four P ports (that is, coupled with all the four P ports) of the second channel selector-switch of the second transmitting module. A fourth T port of the second channel selector-switch of the first transmitting module is coupled with a fourth P port of the second channel selector-switch of the first transmitting module. A fourth T port of the second channel selector-switch of the second transmitting module is coupled with a fourth P port of the second channel selector-switch of the second transmitting module. A P port of a second transfer switch of the first receiving module is coupled with a tenth external port of the second transmitting module to support signal transmitting and receiving functions of the first receiving module. A P port of a second transfer switch of the second receiving module is coupled with a tenth external port of the first transmitting module to support signal transmitting and receiving functions of the second receiving module. The first receiving port selector-switch and the second receiving port selector-switch each include an SP3T switch. The first receiving port selector-switch is coupled with a fourteenth external port of the first transmitting module, and the second receiving port selector-switch is coupled with a fourteenth external port of the second transmitting module.

A first transmitting port Nx TX1 in a first band of the radio frequency transceiver is coupled with a first external port of the first transmitting module. A first transmitting port Ny TX1 in a second band of the radio frequency transceiver is coupled with a third external port of the first transmitting module. A first transmitting port Nz TX1 in a third band of the radio frequency transceiver is coupled with a fifth external port of the first transmitting module. A second transmitting port Nx TX2 in the first band of the radio frequency transceiver is coupled with a first external port of the second transmitting module. A second transmitting port Ny TX2 in the second band of the radio frequency transceiver is coupled with a third external port of the second transmitting module. A second transmitting port Nz TX2 in the third band of the radio frequency transceiver is coupled with a fifth external port of the second transmitting module. A first receiving port Nx RX1 in the first band of the radio frequency transceiver is coupled with a second external port of the first transmitting module. A first receiving port Ny RX1 in the second band of the radio frequency transceiver is coupled with a fourth external port of the first transmitting module. A first receiving port Nz RX1 in the third band of the radio frequency transceiver is coupled with a sixth external port of the first transmitting module. A second receiving port Nx RX2 in the first band of the radio frequency transceiver is coupled with a second external port of the second transmitting module. A second receiving port Ny RX2 in the second band of the radio frequency transceiver is coupled with a fourth external port of the second transmitting module. A second receiving port Nz RX2 in the third band of the radio frequency transceiver is coupled with a sixth external port of the second transmitting module. A third receiving port Nx RX3 in the first band, a third receiving port Ny RX3 in the second band, and a third receiving port Nz RX3 in the third band of the radio frequency transceiver are respectively coupled with three T ports of the first receiving port selector-switch. A fourth receiving port Nx RX4 in the first band, a fourth receiving port Ny RX4 in the second band, and a fourth receiving port Nz RX4 in the third band of the radio frequency transceiver are respectively coupled with three T ports of the second receiving port selector-switch. A P port of the first receiving port selector-switch is coupled with the fourteenth external port of the first transmitting module. A P port of the second receiving port selector-switch is coupled with the fourteenth external port of the second transmitting module. A first power detection port PDET1 of the radio frequency transceiver is coupled with an eleventh external port of the first transmitting module. A second PDET2 is coupled with an eleventh external port of the second transmitting module.

The first antenna group is coupled with a seventh external port of the first transmitting module. The second antenna group is coupled with a seventh external port of the second transmitting module. The third antenna group is coupled with a P port of a first transfer switch (including an SP3T switch) of the first receiving module. The fourth antenna group is coupled with a P port of a first transfer switch (including an SP3T switch) of the second receiving module.

The radio frequency architecture described above is applied to an electronic device, and the electronic device switches on a transmitting path between a transmitting port in a target band of the radio frequency transceiver and a target antenna group in the radio frequency system, to transmit a signal through an antenna in the target antenna group.

In an example, in the case that the first T port of the second channel selector-switch of the first transmitting module is fully coupled with the four P ports of the second channel selector-switch of the first transmitting module, the first T port of the second channel selector-switch of the second transmitting module is fully coupled with the four P ports of the second channel selector-switch of the second transmitting module, the fourth T port of the second channel selector-switch of the first transmitting module is coupled with the fourth P port of the second channel selector-switch of the first transmitting module, and the fourth T port of the second channel selector-switch of the second transmitting module is coupled with the fourth P port of the second channel selector-switch of the second transmitting module, the electronic device including the foregoing radio frequency architecture performs SRS transmission with four antennas in turn or autonomous transmission switching as follows.

In the first transmission period, the electronic device controls the first T port of the second channel selector-switch of the first transmitting module to be connected to a first P port of the second channel selector-switch of the first transmitting module, at the same time, controls the first T port of the second channel selector-switch of the first transmitting module to be connected to the fourth P port of the second channel selector-switch of the first transmitting module (corresponding to the tenth external port of the first transmitting module), and controls an internal Bypass channel of the second receiving module to be switched on, to realize signal transmission through antennas in the first antenna group and the fourth antenna group.

In the second transmission period, the electronic device controls the first T port of the second channel selector-switch of the second transmitting module to be connected to a first P port of the second channel selector-switch of the second transmitting module (corresponding to the seventh external port of the second transmitting module), at the same time, controls the first T port of the second channel selector-switch of the second transmitting module to be connected to the fourth P port of the second channel selector-switch of the second transmitting module, and controls an internal Bypass channel of the first receiving module to be switched on, to realize signal transmission through antennas in the second antenna group and the third antenna group.

Alternatively, at any time, when detecting that antenna switching is required, the electronic device determines a signal transmission link of the target antenna group and controls the signal transmission link to be switched on, to achieve signal transmission through the antenna in the target antenna group. The signals include SRS TX signals or other signals, where other signals include various types of service data signals.

It should be noted that the external ports of the transmitting module and the external ports of the receiving module of the implementation are extensible (that is, some external ports remain unconnected), for unification of modules to conveniently support various types of radio frequency systems. In an example, in the radio frequency system of this application, the external port of the transmitting module for connecting to the receiving module is not limited to the tenth external port and can be flexibly adjusted as required, which is not limited herein.

Furthermore, the above-mentioned second channel selector-switch may have various simplified connection forms, for example, one T port is only connected to one P port, etc., which is not limited herein.

Furthermore, the external port described in the implementations may be a port inherent to the internal device of the module, or may be an independent physical port extended with a wire, which is not limited herein. The internal ports of the above various n1Pn2T (n1 is greater than or equal to 1, and n2 is greater than or equal to 2) switches (including any of the described channel selector-switch, power detection selector-switch, transmit-receive transfer switch, first transfer switch, second transfer switch, receiving port selector-switch, etc.) may be in full connection or simplified connection, and the connection between internal ports may be correspondingly set according to requirements. For example, for the 4P4T switch, the first P port can be coupled only with the first T port, and the second P port can be coupled with three T ports. A switch with a full-coupling structure has an internal controllable circuit structure that can construct a path, such as construction and control through a switch transistor.

Furthermore, the coaxial cable in the radio frequency system described in the implementations may also be replaced by a liquid crystal polymer (LCP) material such as LCP soft board or the like.

In a fourth aspect, implementations provide an electronic device. The electronic device includes the radio frequency system according to any aspect of the foregoing implementations and a battery surrounded by the radio frequency system. The radio frequency system includes a radio frequency transceiver, a radio frequency processing circuit, and at least two antenna groups. The radio frequency transceiver is coupled with the radio frequency processing circuit, and the radio frequency processing circuit is coupled with the at least two antenna groups. The radio frequency system supports a simultaneous downlink reception with four antennas. The at least two antenna groups include m antennas, where m is greater than or equal to 4 and less than or equal to 8. The radio frequency processing circuit includes modules which are the same in number as the at least two antenna groups. The modules include one or more transmitting modules, or the modules include one or more transmitting modules and one or more receiving modules. Each transmitting module is disposed adjacent to the antenna group with which the transmitting module is coupled, and each receiving module is disposed adjacent to the antenna group with which the receiving module is coupled.

The electronic device at least includes any of: a mobile terminal and a base station.

In a fifth aspect, implementations provide a method for controlling antenna switching. The method is applicable to the electronic device of the above implementations. The electronic device includes a radio frequency system. The radio frequency system includes a radio frequency transceiver, a radio frequency processing circuit, and at least two antenna groups. As illustrated in FIG. 4, the method begins at 401.

At 401, the electronic device switches on a transmitting path between a transmitting port in a target band of the radio frequency transceiver and a target antenna group in the radio frequency system, to transmit a signal through an antenna in the target antenna group.

The target band includes n79, n77, n41, and other bands in 5G NR, which is not limited herein. The transmitting port refers to the signal transmitting port of the radio frequency transceiver, and the target antenna group includes the first antenna group or the second antenna group or the third antenna group or the fourth antenna group. The signals include SRS TX signals or other signals.

It can be seen that in this example, the electronic device can realize flexible switching of signal transmitting functions of the four antenna groups, meet 5G NR uplink switching requirements, and improve flexibility of signal transmission.

In an example, the radio frequency system includes the radio frequency system of FIG. 3B. In the case that the first T port of the second channel selector-switch of the first transmitting module is fully coupled with the four P ports of the second channel selector-switch of the first transmitting module, the first T port of the second channel selector-switch of the second transmitting module is fully coupled with the four P ports of the second channel selector-switch of the second transmitting module, the fourth T port of the second channel selector-switch of the first transmitting module is coupled with the fourth P port of the second channel selector-switch of the first transmitting module, and the fourth T port of the second channel selector-switch of the second transmitting module is coupled with the fourth P port of the second channel selector-switch of the second transmitting module, the electronic device including the foregoing radio frequency architecture performs SRS transmission with four antennas in turn or autonomous transmission switching as follows.

In the first transmission period, the electronic device controls the first T port of the second channel selector-switch of the first transmitting module to be connected to a first P port of the second channel selector-switch of the first transmitting module, at the same time, controls the first T port of the second channel selector-switch of the first transmitting module to be connected to the fourth P port of the second channel selector-switch of the first transmitting module (corresponding to the tenth external port of the first transmitting module), and control an internal Bypass channel of the second receiving module to be switched on, to realize signal transmission through antennas in the first antenna group and the fourth antenna group.

In the second transmission period, the electronic device controls the first T port of the second channel selector-switch of the second transmitting module to be connected to a first P port of the second channel selector-switch of the second transmitting module (corresponding to the seventh external port of the second transmitting module), at the same time, controls the first T port of the second channel selector-switch of the second transmitting module to be connected to the fourth P port of the second channel selector-switch of the second transmitting module, and controls an internal Bypass channel of the first receiving module to be switched on, to realize signal transmission through antennas in the second antenna group and the third antenna group.

Alternatively, at any time, when detecting that antenna switching is required, the electronic device determines a signal transmission link of the target antenna group and controls the signal transmission link to be switched on, to achieve signal transmission through the antenna in the target antenna group. The signals include SRS TX signals or other signals, where other signals include various types of service data signals.

In a sixth aspect, implementations provide an electronic device 500. FIG. 5 is a schematic structural diagram illustrating the electronic device 500. As illustrated in FIG. 5, the electronic device 500 includes an application processor 510, a memory 520 configured to store one or more programs 521, and a communication interface 530. The one or more programs 521 are configured to be executed by the application processor 510 and include instructions for performing the following.

A transmitting path(s) between a transmitting port(s) in a target band of the radio frequency transceiver and a target antenna group(s) in the radio frequency system is switched on, to achieve signal transmission through an antenna(s) in the target antenna group(s).

According to the implementations, the electronic device can achieve switching between multiple transmit antennas, thus satisfying an antenna switching function in a multiple-antenna architecture.

In a seventh aspect, as illustrated in FIG. 6, implementations provide a device for controlling antenna switching. The device for controlling antenna switching is applicable to the electronic device of the above implementations. The electronic device includes a radio frequency system. The radio frequency system includes a radio frequency transceiver, a radio frequency processing circuit, and at least two antenna groups. The device for controlling antenna switching includes a processing unit 601 and a communication unit 602.

The processing unit 601 is configured to, through the communication unit 602, switch on a transmitting path between a transmitting port in a target band of the radio frequency transceiver and a target antenna group in the radio frequency system, to transmit a signal through an antenna in the target antenna group.

The device for controlling antenna switching may further include a storage unit 603 for storing program codes and data of the electronic device. The processing unit 601 may be a processor. The communication unit 602 may be a touch screen display or a transceiver. The storage unit 603 may be a memory.

According to the implementations, the electronic device can achieve switching between multiple transmit antennas, thus satisfying an antenna switching function in a multiple-antenna architecture.

Implementations also provide a computer readable storage medium. The computer readable storage medium is configured to store computer programs for electronic data interchange which, when executed, are operable with a computer to execute all or part of the operations of any of the methods described in the above-described method implementations. The computer may include an electronic device.

Implementations also provide a computer program product. The computer program product includes a non-transitory computer readable storage medium that stores computer programs. The computer programs are operable with a computer to perform all or part of the operations of any of the methods described in the above method implementations. The computer program product may be a software installation package. The computer may include an electronic device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skilled in the art that all or a part of the various methods of the implementations described above may be accomplished by means of a program to instruct associated hardware, the program may be stored in a computer-readable memory, which may include a flash memory, a ROM, a RAM, Disk or CD, and so on.

The implementations are described in detail above. The principle and implementation are described herein through specific examples. The above description about the implementations is merely provided to help understand the method and core ideas. In addition, a person of ordinary skilled in the art can make variations and modifications to the present disclosure in terms of the specific implementations and application scopes according to the ideas. Therefore, the content of specification shall not be construed as a limit to the present disclosure. The above is the implementations. It shall be pointed out that a person ordinarily skilled in the art can make some improvements and polishes without departing from the principle of the implementations. These improvements and polishes shall be construed to be the protection range.

What is claimed is:

1. A radio frequency system, supporting simultaneous downlink reception with four antennas and comprising:
    at least two antenna groups comprising m antennas, m being greater than or equal to 4 and less than or equal to 8;
    a radio frequency processing circuit coupled with the at least two antenna groups and comprising modules which are a same in number as the at least two antenna groups, each module being coupled with one antenna group, each module being disposed adjacent to the antenna group with which the module is coupled, and the modules comprising one or more transmitting modules and one or more receiving modules; and
    a radio frequency transceiver coupled with the radio frequency processing circuit, wherein the radio frequency system is operable in triple band, and wherein:
    each receiving module comprises three signal receiving channels, a first transfer switch coupled with the three signal receiving channels, and a second transfer switch coupled with the three signal receiving channels;
    the first transfer switch comprises a single-pole five-throw (SP5T) switch, the second transfer switch comprises a single-pole quad-throw (SP4T) switch, and each signal receiving channel comprises a filter and a low noise amplifier (LNA) coupled with the filter;
    the first transfer switch is configured to be coupled with an antenna in an antenna group corresponding to a receiving module that the first transfer switch belongs to, the second transfer switch is configured to be coupled with one transmitting module, and the receiving module is disposed adjacent to the antenna group; and
    each receiving module further comprises one auxiliary port (AUX), wherein the AUX is coupled with a T port of the first transfer switch and configured to be coupled with one transmitting module to support a signal transmitting function of each receiving module.

2. The radio frequency system of claim 1, wherein the radio frequency system supports a dual-transmit mode and the one or more transmitting modules are embodied as two transmitting modules.

3. The radio frequency system of claim 2, further comprising a main board, wherein the main board is configured to dispose the two transmitting modules.

4. The radio frequency system of claim 2, wherein:
    m=4, the at least two antenna groups comprise four antenna groups, and each antenna group comprises one antenna;
    the one or more receiving modules are embodied as two receiving modules; and
    the radio frequency system further comprises a secondary board, wherein the secondary board is configured to dispose the two receiving modules.

5. The radio frequency system of claim 4, wherein:
    the radio frequency transceiver is coupled with each transmitting module; and
    each transmitting module is coupled with one receiving module disposed on the secondary board to support signal receiving and transmitting functions of the receiving module.

6. The radio frequency system of claim 5, wherein the radio frequency processing circuit further comprises two receiving port selector-switches, each receiving port selector-switch is coupled with signal receiving ports of the radio frequency transceiver and one transmitting module, and the receiving port selector-switch comprises a single-pole triple-throw (SP3T) switch.

7. The radio frequency system of claim 6, wherein the radio frequency system is operable in triple band, wherein:
    each transmitting module comprises three signal transmit-receive processing circuits, one power coupler, and two channel selector-switches, wherein
    the three signal transmit-receive processing circuits are coupled with a first channel selector-switch in the two channel selector-switches;
    the first channel selector-switch is coupled with the power coupler; and
    the power coupler is coupled with a second channel selector-switch in the two channel selector-switches; and
    the first channel selector-switch comprises an SP3T switch and the second channel selector-switch comprises a quad-pole quad-throw (4P4T) switch and is a channel selector-switch in simplified connection.

8. The radio frequency system of claim 7, wherein the second channel selector-switch is coupled with an antenna group corresponding to a transmitting module that the second channel selector-switch belongs to.

9. The radio frequency system of claim 7, wherein each signal transmit-receive processing circuit comprises:
    a power amplifier (PA);
    a low noise amplifier (LNA);
    a transmit-receive transfer switch coupled with the PA and the LNA; and
    a filter coupled with the transmit-receive transfer switch.

10. The radio frequency system of claim 9, wherein:
    the PA has an input port configured to be coupled with a signal transmitting port of the radio frequency transceiver;
    the LNA has an output port configured to be coupled with a signal receiving port of the radio frequency transceiver; and
    the power coupler is configured to be coupled with a power detection (PDET) port of the radio frequency transceiver.

11. The radio frequency system of claim 1, wherein each receiving module further comprises one internal Bypass channel, wherein the internal Bypass channel is disposed between the first transfer switch and the second transfer switch and configured to be coupled with one transmitting module to support a signal transmitting function of each receiving module.

12. An electronic device comprising:
    a radio frequency system supporting simultaneous downlink reception with four antennas and comprising:

at least two antenna groups comprising m antennas, m being greater than or equal to 4 and less than or equal to 8;

a radio frequency processing circuit coupled with the at least two antenna groups and comprising modules which are a same in number as the at least two antenna groups, the modules comprising one or more transmitting modules and one or more receiving modules, each transmitting module being disposed adjacent to an antenna group with which the transmitting module is coupled, and each receiving module being disposed adjacent to an antenna group with which the receiving module is coupled;

a radio frequency transceiver coupled with the radio frequency processing circuit; and a battery surrounded by the radio frequency system, wherein the radio frequency system is operable in triple band, and wherein:

each receiving module comprises three signal receiving channels, a first transfer switch coupled with the three signal receiving channels, and a second transfer switch coupled with the three signal receiving channels;

the first transfer switch comprises a single-pole five-throw (SP5T) switch, the second transfer switch comprises a single-pole quad-throw (SP4T) switch, and each signal receiving channel comprises a filter and a low noise amplifier (LNA) coupled with the filter;

the first transfer switch is configured to be coupled with the antenna in an antenna group corresponding to a receiving module that the first transfer switch belongs to, the second transfer switch is configured to be coupled with one transmitting module, and the receiving module is disposed adjacent to the antenna group; and each receiving module further comprises two auxiliary ports (AUXs), wherein the two AUXs are respectively coupled with the first transfer switch and the second transfer switch and an external Bypass channel is configured to be disposed between the first transfer switch and the second transfer switch to support a signal transmitting function of each receiving module.

13. The electronic device of claim 12, wherein the radio frequency system supports a dual-transmit mode, the one or more transmitting modules are embodied as two transmitting modules, and the one or more receiving modules are embodied as two receiving modules.

* * * * *